(12) United States Patent
McClanahan

(10) Patent No.: US 7,737,991 B2
(45) Date of Patent: Jun. 15, 2010

(54) METHOD OF VISUALIZING A COLOR DEVIATION

(75) Inventor: Craig J. McClanahan, Bowling Green, OH (US)

(73) Assignee: BASF Corporation, Southfield, MI (US)

( * ) Notice: Subject to any disclaimer, the term of this patent is extended or adjusted under 35 U.S.C. 154(b) by 775 days.

(21) Appl. No.: 11/200,790

(22) Filed: Aug. 9, 2005

(65) Prior Publication Data

US 2007/0035554 A1 Feb. 15, 2007

(51) Int. Cl.
*G09G 5/02* (2006.01)

(52) U.S. Cl. .................................. 345/594

(58) Field of Classification Search ............... 345/597, 345/594, 595
See application file for complete search history.

(56) References Cited

U.S. PATENT DOCUMENTS

| | | | |
|---|---|---|---|
| 5,212,546 A | 5/1993 | Arazi et al. | |
| 5,739,806 A * | 4/1998 | Hissen et al. | 345/633 |
| 6,519,360 B1 * | 2/2003 | Tanaka | 382/162 |
| 6,539,325 B1 | 3/2003 | Numata et al. | |
| 7,106,343 B1 * | 9/2006 | Hickman | 345/589 |
| 2002/0161530 A1 | 10/2002 | Corrigan et al. | |
| 2003/0184557 A1 | 10/2003 | Wen | |
| 2004/0093112 A1 | 5/2004 | Marchand et al. | |

FOREIGN PATENT DOCUMENTS

EP 0767362 A1 3/1996

OTHER PUBLICATIONS

Search Report and Written Opinion for PCT/US2006/025048, filed Jun. 26, 2006.

* cited by examiner

*Primary Examiner*—Jeffery A Brier
(74) *Attorney, Agent, or Firm*—Howard & Howard Attorneys PLLC

(57) ABSTRACT

A method of visualizing a color deviation of an actual color on a vehicle panel being painted utilizing a computer. A reference color image is displayed on a monitor to confirm that the reference color image is the appropriate color image relating to the actual color. Differences between that displayed reference color image and the actual color are inputted into the computer and the reference image is then translated into a revised color image. The revised color image is displayed on the monitor along with the reference color image such that a user can visually compare the differences between that displayed reference color image and displayed revised color image. The displayed revised color image can then be compared to the actual color to determine if any color deviations between the revised color image and the actual color remain.

52 Claims, 16 Drawing Sheets

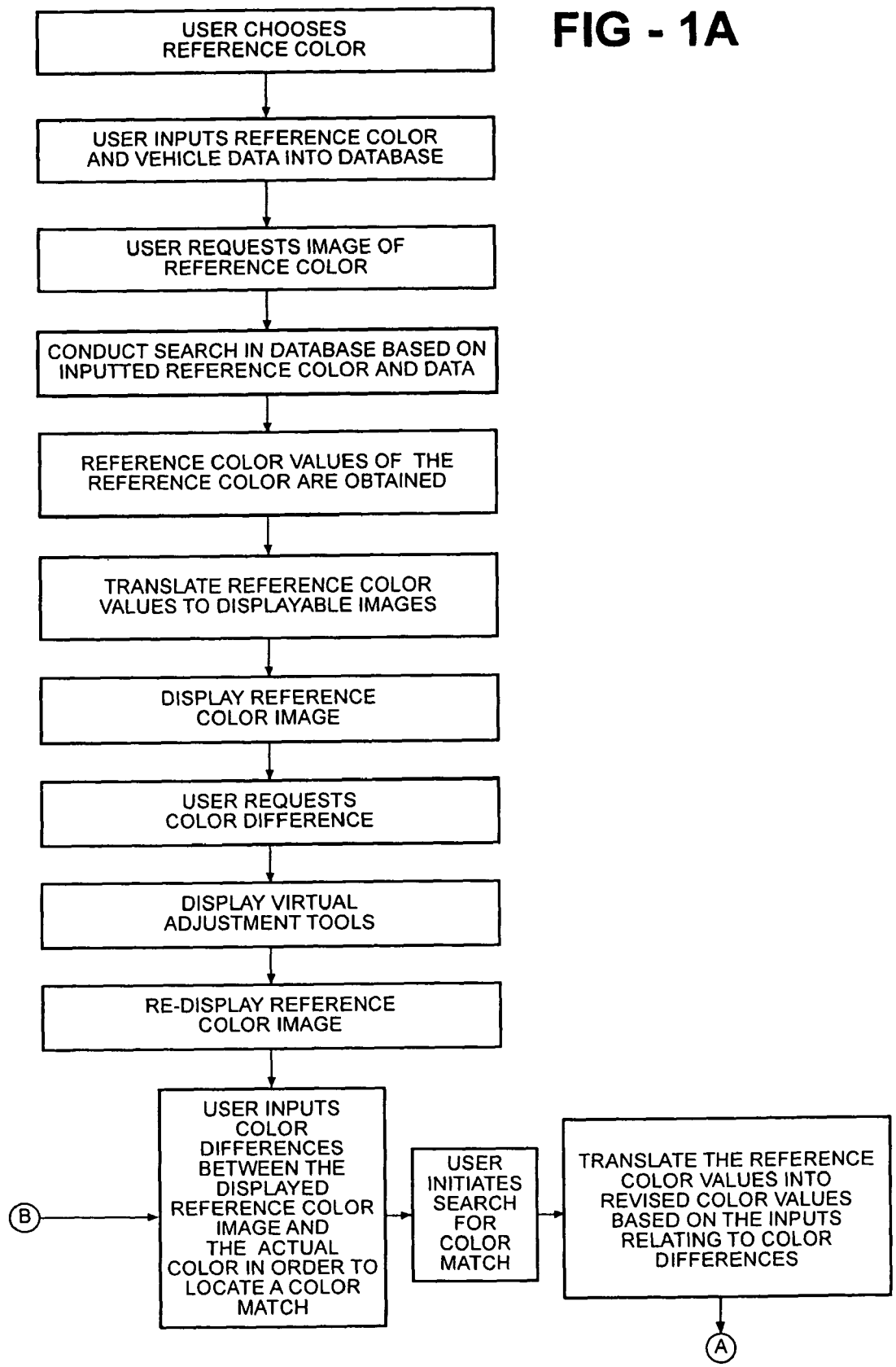

METHOD OF VISUALIZING A COLOR DEVIATION

BACKGROUND OF THE INVENTION

1. Field of the Invention

The present invention relates generally to color matching and more particularly to a method of visually displaying a color deviation of an actual color.

2. Description of Related Art

Modern vehicles, such as automobiles, typically are offered to consumers in a wide variety of paint colors. In fact, from model year to model year, it is not uncommon for a particular vehicle model to be available in several paint colors. Variations in the color and appearance of the paint color may arise from a number of factors including changes in paint formulation, effect degradation, paint and stability, and changes in the application conditions or equipment. Color changes brought about by environmental degradation of the coating may also take place.

Due to the variations in paint color it can be difficult to match the color of a vehicle during a repair of the vehicle. One refinish formula typically does not work for all vehicles of a given color code. For example, when a vehicle's body panels are damaged and require repainting, a refinish paint supplier must take into consideration variations in paint color and will therefore supply one or more paint formulations to the repair shop. By supplying a number of formulations or variants for a particular color, the paint manufacturer accounts for the paint color variations which may affect the actual color of the vehicle. Typically, the formulations for a particular color are distributed to the repair shops on paper, microfiche, compact disc, or over the internet. A color tool, composed of swatches of the variants for each color, may also be produced and delivered to each repair shop.

The repair shop then selects which formulation most closely matches the part to be painted. Typically this is done visually, i.e., by comparing swatches to the part or spaying a test piece with each formulation. The repair shop may then modify the selected formula by manually tinting the paint formula.

Several difficulties arise from these prior art approaches. Commonly a large number of variants are derived to properly characterize the color population. This is a difficult and time consuming task for the paint supplier to produce these variant formulas. Public showing of the variant formulas is also problematic as there is no convenient way for a repair shop technician to locate the best formula for the particular repair job. Often the paint technician uses a reference to aid in selecting the proper variant formula. Such a reference might be a spray out of the selected formula. Frequently, due to an insufficient number of variant formulas or difficulty in identifying the proper variant, the paint technician is forced to try to adequately tint the paint formula to match the actual color of the vehicle being repaired.

In order to expedite the process of variant selection, the paint supplier may provide the paint technician with color tools which are physical representations of the reference and variant colors. There are however limitations associated with these tools. Introducing a sufficient number of variant colors makes the tools unwieldy and expensive. Additionally, the time from variant identification to production and updating the customer's tool is significant. Color tools also have a limited life span. The color tools are typically color plates which can become worn and damaged with time.

Another option for variant selection is to use a spectrophotometer. This device however is costly, requires substantial customer training, and currently does no quantify the coarseness or sparkle of the finish. These instruments are also rather fragile and can be adversely affected by the repair shop environment.

Accordingly, it will be desirable to develop a method or system for determining a color match and locating a corresponding paint formulation that is relatively easy to use, is of low cost, can produce a large number of variants, and does not suffer from the prior art approaches outlined above.

SUMMARY OF THE INVENTION AND ADVANTAGES

In a first embodiment, the subject invention includes a method of visualizing a color deviation of an actual color using a computer having a monitor. The method comprises the steps of: inputting a reference color into the computer; obtaining reference color values of the reference color; displaying a reference color image on the monitor with the reference color image corresponding to the reference color values; inputting color differences between the displayed reference color image and the actual color into the computer; translating the reference color values into revised color values based on the inputted color differences using the computer; and displaying a revised color image, corresponding to the revised color values, on the monitor along with the reference color image for visually comparing the inputted color differences between the displayed reference color image and the displayed revised color image.

In a second embodiment of the subject invention, the method of visualizing the color deviation comprises the steps of: inputting vehicle data into the computer; obtaining a reference color and corresponding reference color values based on the inputted vehicle data; displaying a reference color image on the monitor with the reference color image corresponding to the reference color values; inputting color differences between the displayed reference color image and the actual color into the computer; translating the reference color values into revised color values based on the inputted color differences using the computer; and displaying a revised color image, corresponding to the revised color values, on the monitor along with the reference color image for visually comparing the inputted color differences between the displayed reference color image and the displayed revised color image.

Accordingly, the subject invention includes a method of easily determining a revised or variant color formula based on the revised color image. The reference color image and revised color image are visually displayed on the monitor of the computer to assist the repair shop in quickly and easily determining the correct revised color formula, i.e., color match. The subject method is capable of determining a large number of variant color formulas and is relatively easy to use for a paint technician. Further, a new variant can be created according to the technician's specifications. Also, information about the popularity of the variant is readily made available to the technician. No specific hardware is needed such that the method of the subject invention is typically of low cost. Feedback warnings can also be delivered to the technician and the database of the variant information is kept current. In essence, the subject invention creates a virtual paint room so that the technician can make virtual tinting hints to the formula and observe the corresponding appearance changes. The subject invention therefore addresses difficulties associated with the selection of color variant formulas while avoiding the drawbacks of the prior art approaches.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1A is a partial flow chart of a first embodiment of the subject invention;

DETAILED DESCRIPTION OF THE INVENTION

Figure 1B:
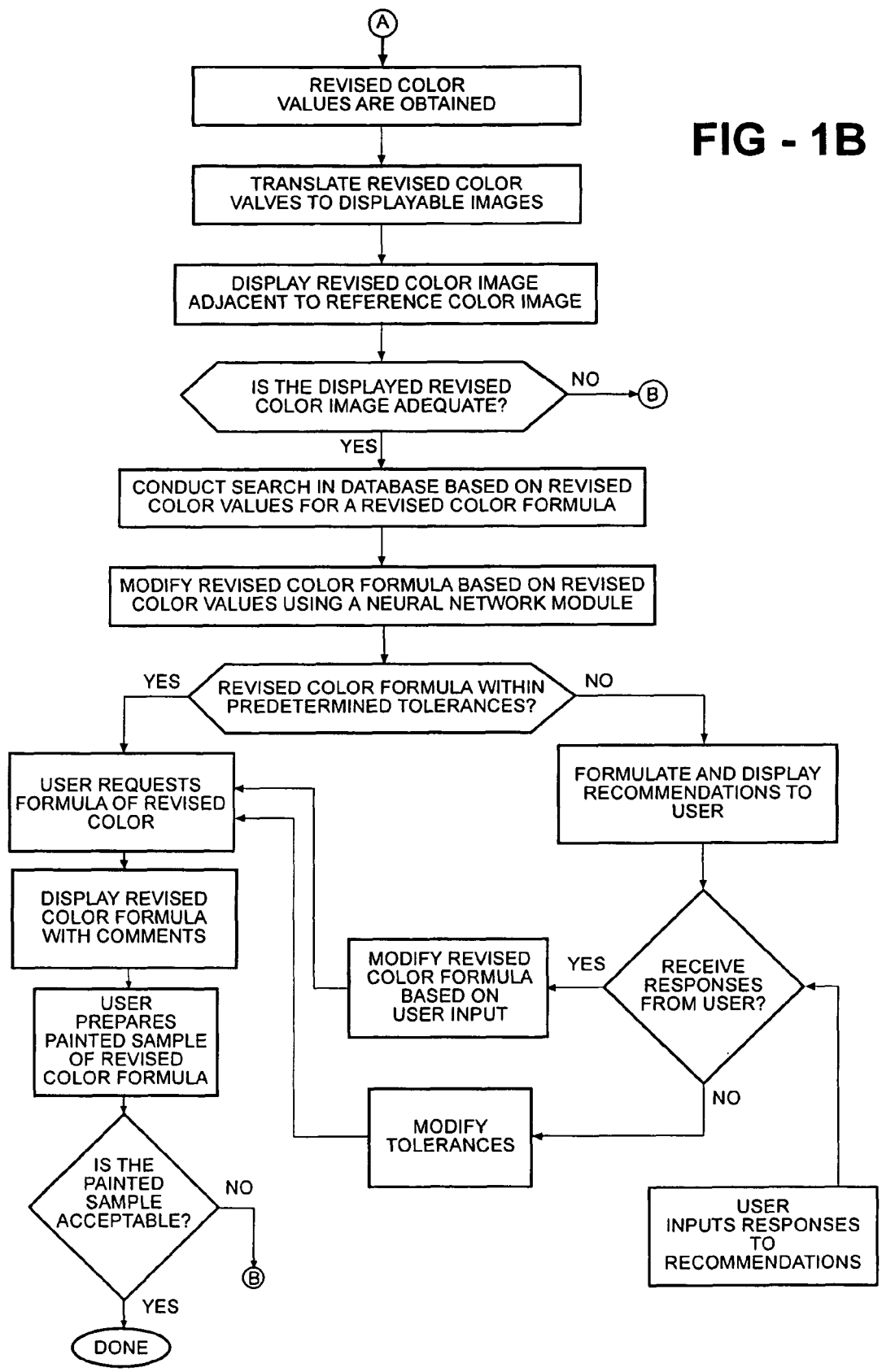
FIG. 1B is the remaining flow chart of the first embodiment.

Referring to the FIGS. 1A and 1B, a flow chart of a first embodiment of the subject invention is generally shown. The flow chart tracks one preferred method of the subject invention and FIGS. 2-6 illustrate various steps of the invention from an input screen to various adjustment screens.

Figure 2:
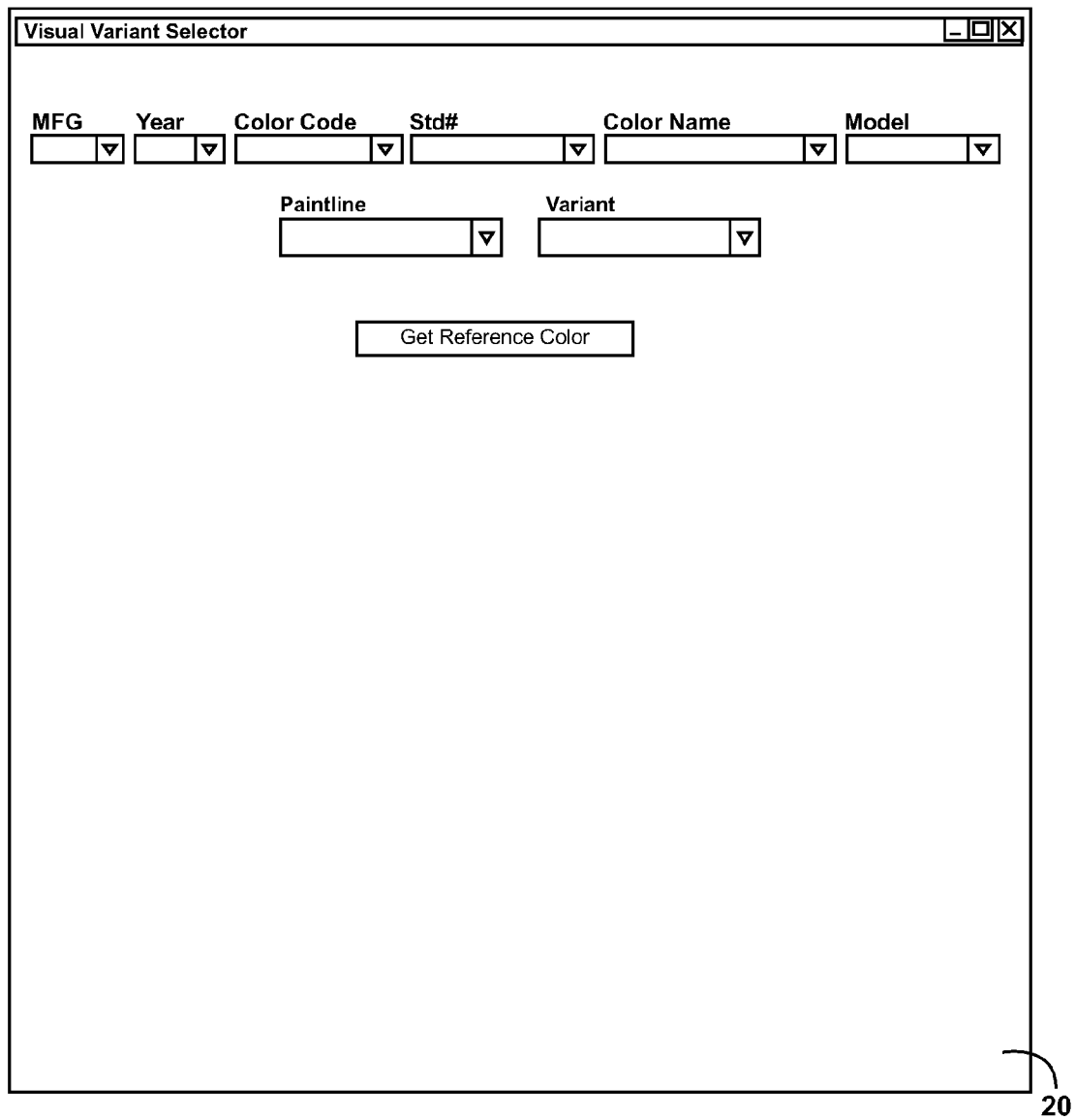
FIG. 2 is a planer view of an input screen.

The method of the subject invention visualizes a color deviation of an actual color utilizing a computer having a monitor. Turning to specifics of the first embodiment of the subject invention as set forth in FIGS. 1A and 1B, the method of the subject invention can begin by a user choosing a reference color. The reference color can be chosen by a variety of different processes, including utilizing a color book, a color tool, a spectrophotometer, or spaying a sample of the reference color. Once the reference color is determined, the user utilizes an input screen 20, which is generally shown in FIG. 2. This input screen 20 could be displayed on any suitable model of any suitable computer. The input screen 20 could include any suitable number of areas for inputting a variety of data, such as the manufacturer of a motor vehicle, the year of the vehicle, the color code, the standard number, the color name, the model, the paintline, and the variant.

Figure 3:
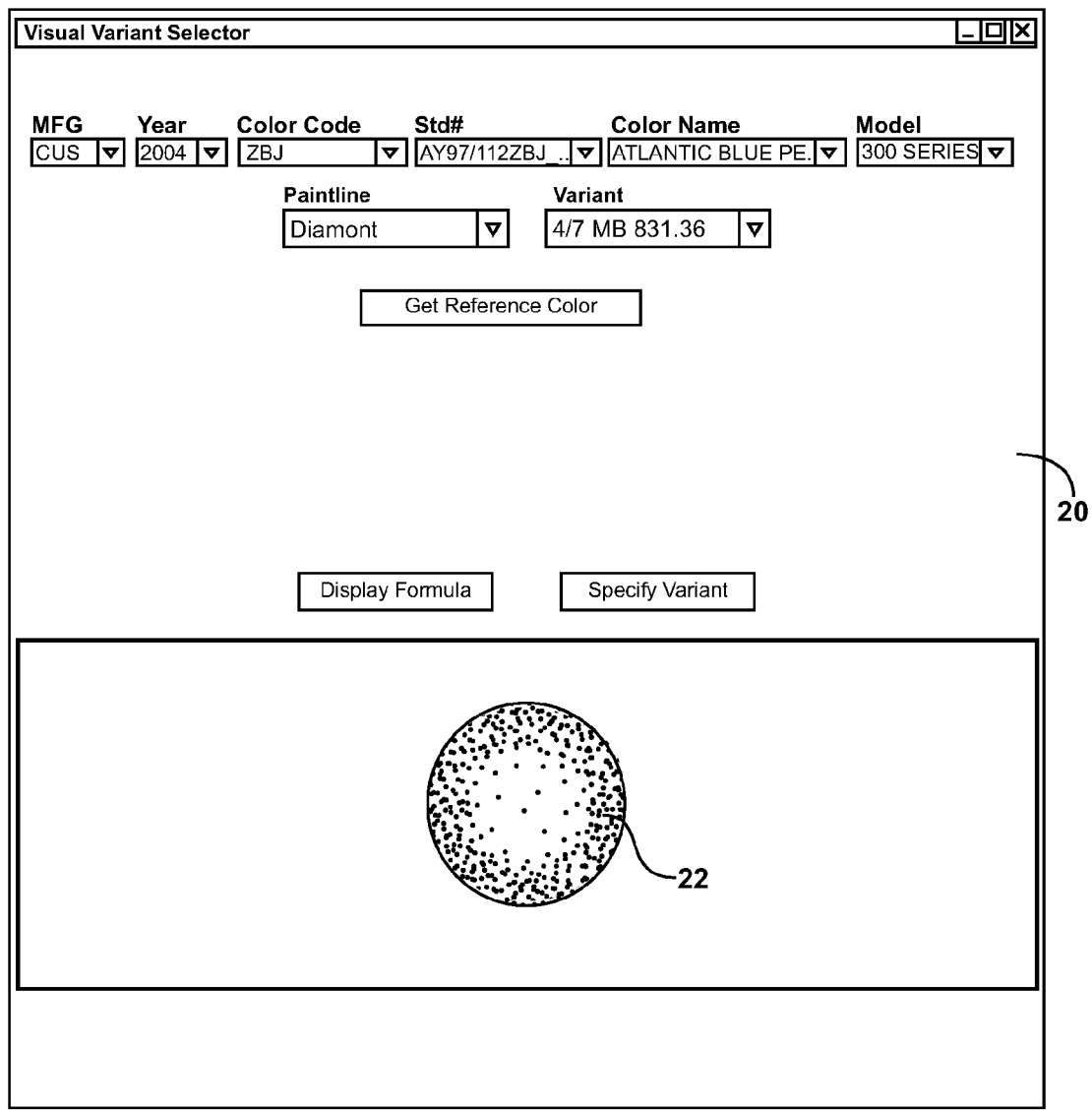
FIG. 3 is a planer view of the input screen that is partially populated with data and an image.

As also shown in FIG. 3, the user preferably inputs the reference color and data relating to the vehicle being repaired into the input screen 20 of the computer. The user then requests the image of the reference color by hitting the "Get Reference Color" button. The inputted reference color and vehicle data is feed into a computer database. The feeding of this information into the computer database is preferably done automatically. A search is conducted in the database based on the inputted reference color and data. The corresponding reference color values of the reference color are then obtained.

Color values refer to color attributes used to qualify a color. The color value may include color space values, reflective values or other suitable color attributes. As one example, color space values are defined by $L^*$, $a^*$, $b^*$ where $L^*$ represents luminous intensity, $a^*$ represents a red/green appearance, and $b^*$ represents a yellow/blue appearance. Another example of color space values are those defined by $L^*$, $C^*$, h, where a $L^*$ represents lightness, $C^*$ represents chroma, and h represents hue.

Color values can be displayed on the monitor but are typically unsuitable for that purpose. Hence, the color values are preferably translated into displayable images. One method for translating the color values into displayable images relates to translating the color values into RGB values. RGB stands for red, green, blue and are the color light sources that cooperate to display color images on screens or monitors. An RGB color is created by mixing the color light sources and RGB equates to the intensities of the mixed red, green, and blue color light sources for the images that are displayed on the monitor.

As shown in FIG. 3, a reference color image 22 is displayed on the input screen 20 of the monitor. The reference color image 22 corresponds to the reference color values. Preferably, the reference color image 22 is displayed in the shape of a sphere, a representation of a vehicle, or any other three-dimensional shape which allows the user to visually examine the reference color at various angles. This sphere, for example, of the displayed reference color image 22 is designed as a reference point or confirmation for the user that the approximate correct color has been chosen. If needed, a reference formula corresponding to the reference color values may also be obtained. As mentioned in the background section above, the actual color of the vehicle being repaired typically deviates from the reference color. Hence, the user will typically recognize that the displayed reference color image 22 does not exactly match the actual color of the vehicle being repaired.

Figure 4:
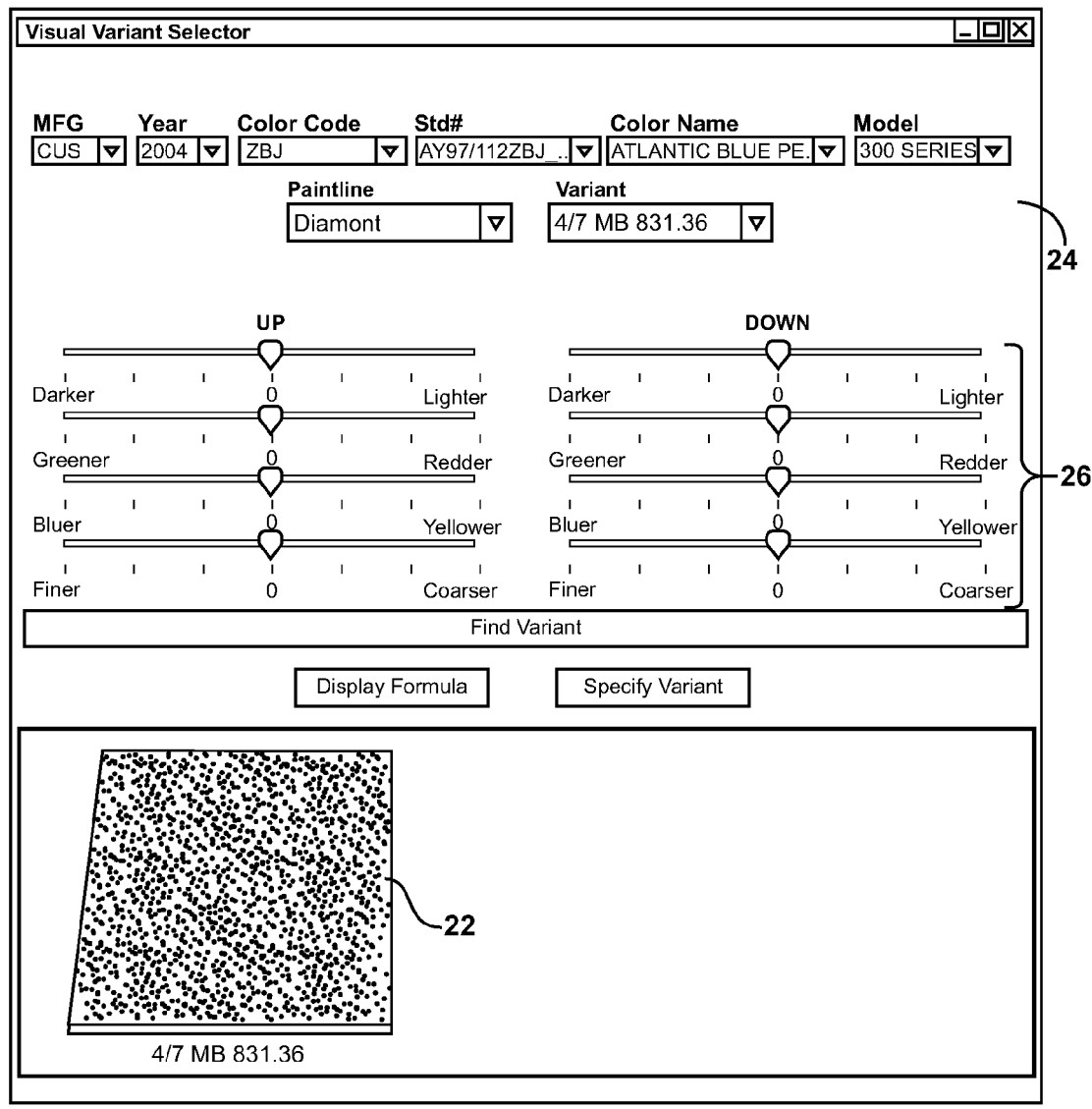
FIG. 4 is a planer view of an adjustment screen illustrating a virtual adjustment tool and is at least partially populated with data and an image.

In order to modify the reference color image 22, the user requests a color difference by clicking on the "Specify Color Difference" button. An adjustment screen 24 is then displayed as shown in FIG. 4. The vehicle data and reference color are carried over from the input screen.

As shown in FIG. 4, a plurality of virtual adjustment tools 26 are displayed on the monitor. Also, the reference color image 22 is re-displayed on the monitor. In particular, the reference color image 22 is re-displayed in the shape of a flat plate below the virtual adjustment tools 26. The adjustment tools 26 can be of any suitable design or configuration and can be configured to correspond to any particular parameter of the displayed referenced color image 22. As shown in the illustrated embodiment, there are two separate columns of virtual adjustment tools 26. One column is labeled as "UP" and the other column is labeled as "DOWN". The UP and DOWN columns relate to the visual orientation of the color image. In particular the UP column correlates to a substantially perpendicular view of the part being painted and the DOWN column relates to a nearly parallel view of the part being painted. Each of the UP and DOWN columns includes similar adjustment scales. In particular there is an adjustment scale relating to "Darker" and "Lighter". There is also an adjustment scale for adjusting between "Greener" and "Redder" color images. Further, there is an adjustment scale for adjusting the color between "Bluer" and "Yellower" color images. Finally, there is an adjustment scale for varying between "Finer" and "Coarser" color values.

Figure 5:
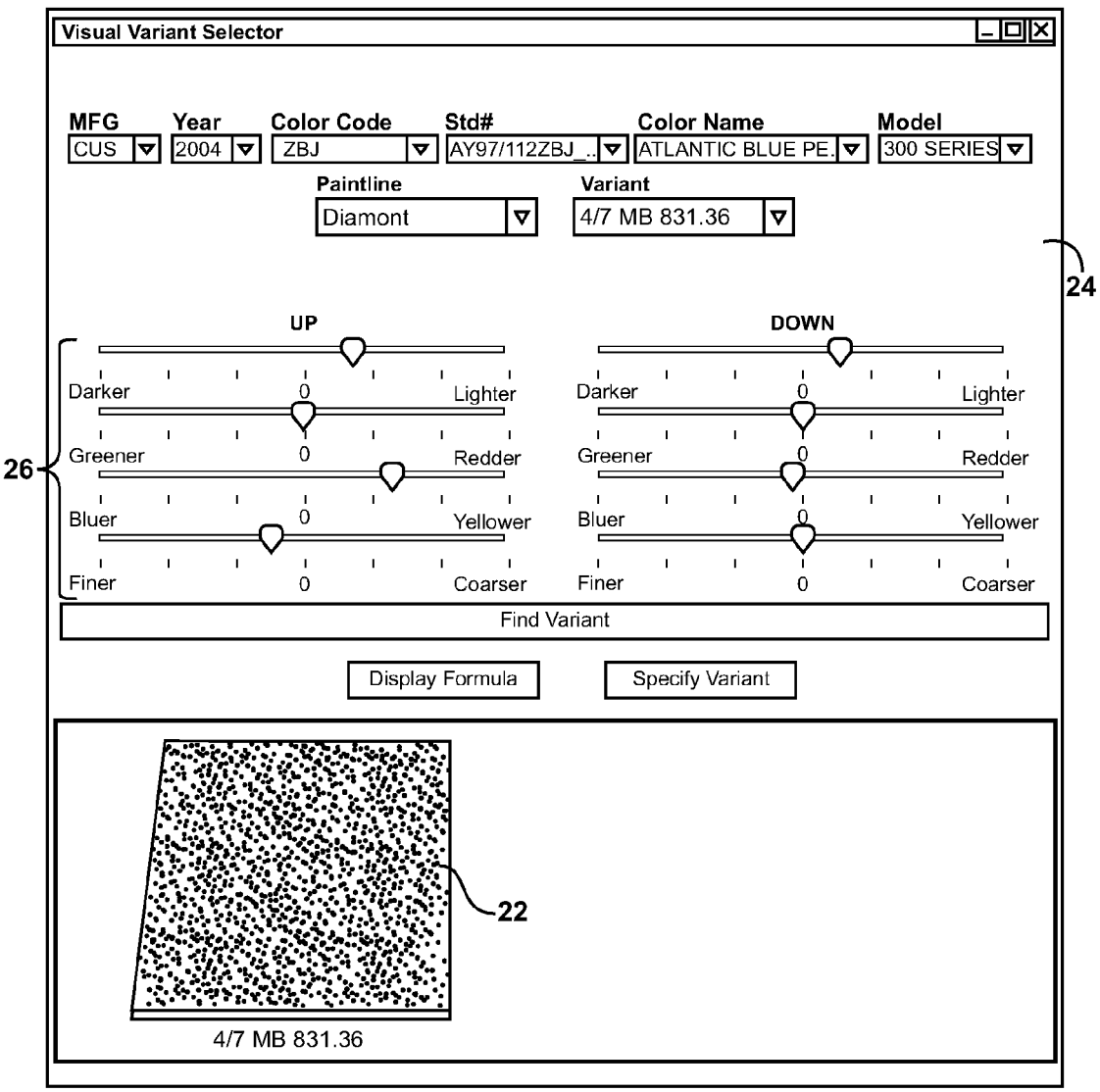
FIG. 5 is a planer view of the adjustment screen with a number of the virtual adjustment tools being manipulated.

As shown in FIG. 5, the subject invention creates a virtual paint room where the user can input a number of color differences between the displayed reference color image 22 and the actual color in order to locate a color match. In particular, the input of the color differences is further defined as manipulating at least one of the virtual adjustment tools 26. As mentioned above, each virtual adjustment tool 26 corresponds to a particular parameter of the displayed reference color image 22. Hence, the step of manipulating the virtual adjustment tool 26 is further defined as manipulating the particular parameter to define a difference for the parameter between the displayed reference color image 22 and the actual color. In the illustrated example, five of the adjustment tools 26 have been manipulated or adjusted. Hence, five different parameters between the displayed referenced color image 22 and the actual color have been adjusted. The inputting of the data as well as the color differences could be done on the same computer that the monitor is attached to or could be done on a separate computer or system. Preferably, the computer includes a computer program and a user interface, such as a keyboard, for inputting the required data. Furthermore, the input may be automatically performed by a series of computer systems and computer databases.

Figure 6:
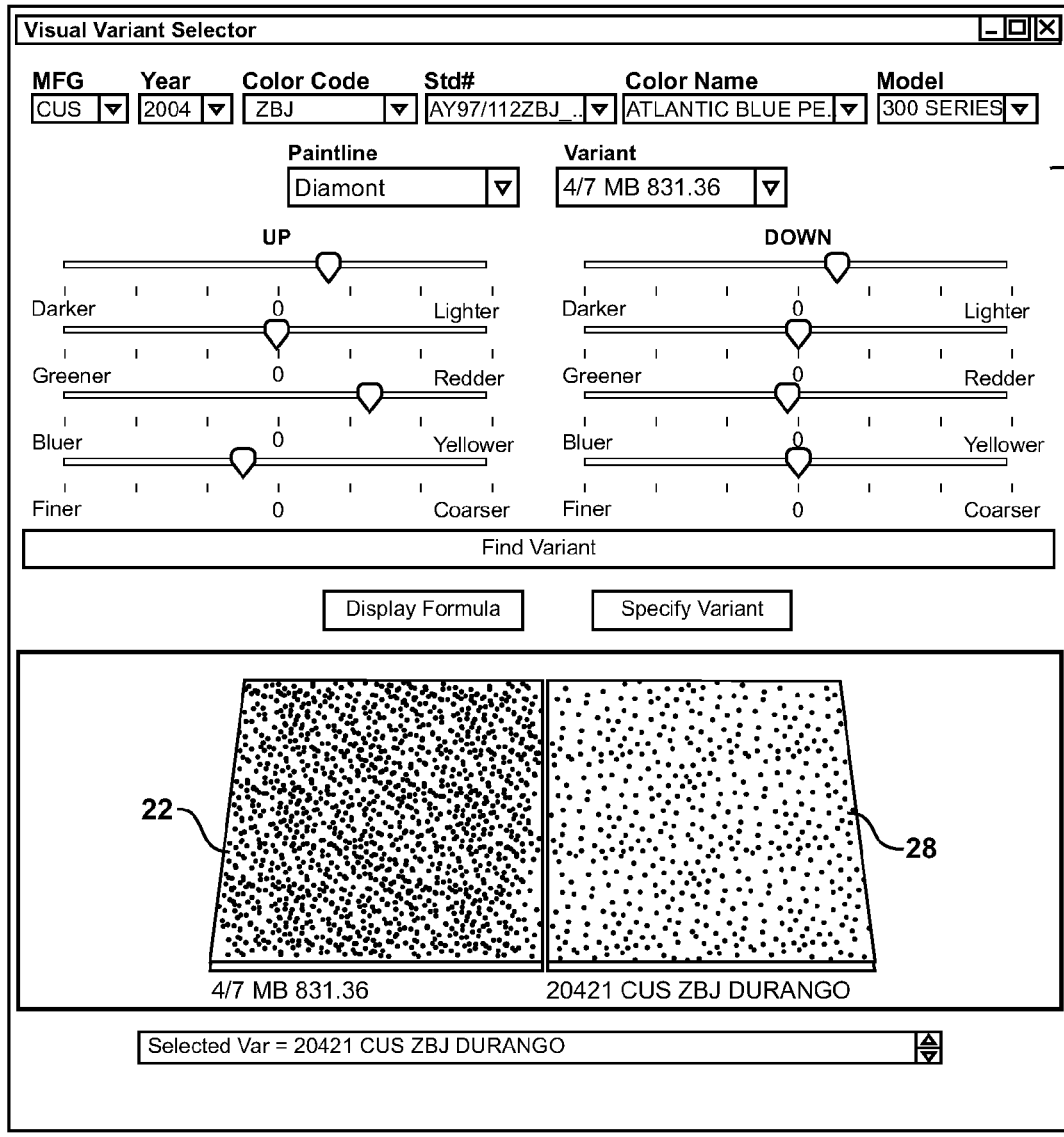
FIG. 6 is a planer view of the adjustment screen with reference and revised color images being displayed.

An alternative means of inputting the differences between the reference color image 22 and the actual color relates to the user virtually tinting the formula of the referenced color image 22. As shown in FIG. 4, the user could press the "Display Formula" button which will display the formula of the reference color image 22. Within the virtual paint room, the user can add tint and modify the reference formula of the referenced color image 22 based on the user's knowledge of this formula and the effects of the tinting. The slider bars will then automatically move and the display of the revised color image (discussed below) will automatically change in response to the modifications/tinting of the formula by the user, such as shown in FIGS. 5 and 6. The remaining processes as discussed below will continue in a similar fashion.

Another alternative means of inputting the differences between the reference color image 22 and the actual color relates to the user utilizing a color measuring device such as a spectrophotometer. In particular, the user typically places the color measuring device against the vehicle to measure the actual color. The color values of the actual color are then imported from the color measuring device into the computer. The differences between the imported color values and the reference color values are determined. The slider bars will then automatically move in response to the differences of the imported color values. Further, the revised color image (discussed below) will be automatically updated in response to the imported color values. The remaining processes discussed below will continue in a similar fashion.

After the user has inputted the differences, the user can initiate a search for a color match by pressing the "Find Color Match" button. The reference color values are then translated into revised color values based on the inputted color differences using the computer. Referring to FIG. 1B, the revised color values are then obtained. The revised color values are then translated into displayable images. As discussed above with regard to translating the reference color values into displayable images, the revised color values are preferably translated in similar manner. In particular, the revised color values are translated into RGB color values.

Turning to FIG. 6, a revised color image 28, which corresponds to the revised color values, is displayed on the monitor along with the reference color image 22. The user can then visually compare the inputted color differences between the displayed reference color image 22 and the displayed revised color image 28 to determine if the displayed revised color image is adequate. Preferably, the displaying of the revised 28 and reference 22 color images are displayed on the same monitor at the same time. Even more preferably, the revised 28 and reference 22 color images are displayed next to or adjacent to each other on the monitor at the same time. In the most preferred embodiment, such as shown in FIG. 6, the revised 28 and reference 22 color images are displayed in 3D in the shape of flat plates with the revised color image 28 on the right and the reference color image 22 on the left. The flat plates can be angled to provide depth to the plates and to allow the user to visualize the difference and revised color images at different angles. The flat plates can be manipulated to provide a plurality of different viewing angles for the revised 28 and reference 22 color images. It should be appreciated that the type of display and orientation of the images is not limited in any manner. As shown in FIG. 6, data relating to the revised color image 28 can also be displayed. Further, a full description of the deviation of the revised color image 28 to the reference color image 22 can be displayed on the monitor.

After the revised color image 28 is displayed, the user will be prompted, for example through a pop-up screen, of whether the displayed revised color image 28 is adequate. If the revised color image 28 is not adequate, e.g., the user made a mistake during the adjustments of the virtual adjustment tools or the revised color image 28 is unexpected, then the user can further adjust the virtual adjustment tools 26 through a similar process as set forth above. This adjusting, displaying, and re-adjusting can continue until the user is comfortable that the displayed revised color image 28 is as close as possible to the actual color.

Once the revised color image 28 is acceptable, the user will prompt the computer to obtain a revised color formula. In particular, the revised color values will be inputted into the computer database, preferably automatically. A search is then conducted in the database based on the revised color values for the revised color formula. Preferably, the revised color formula is then modified based on the revised color values using a neural network module 30. The computer can include an artificial intelligence system, which may contain a neural network module 30 and use fuzzy logic and rule-based systems. During the modification of the revised color formula, there are various constraints placed on the neural network module 30. These constraints relate to, for example, the particle size descriptions. Other constraints such as vehicle model or year production are preferably used.

Figure 7:
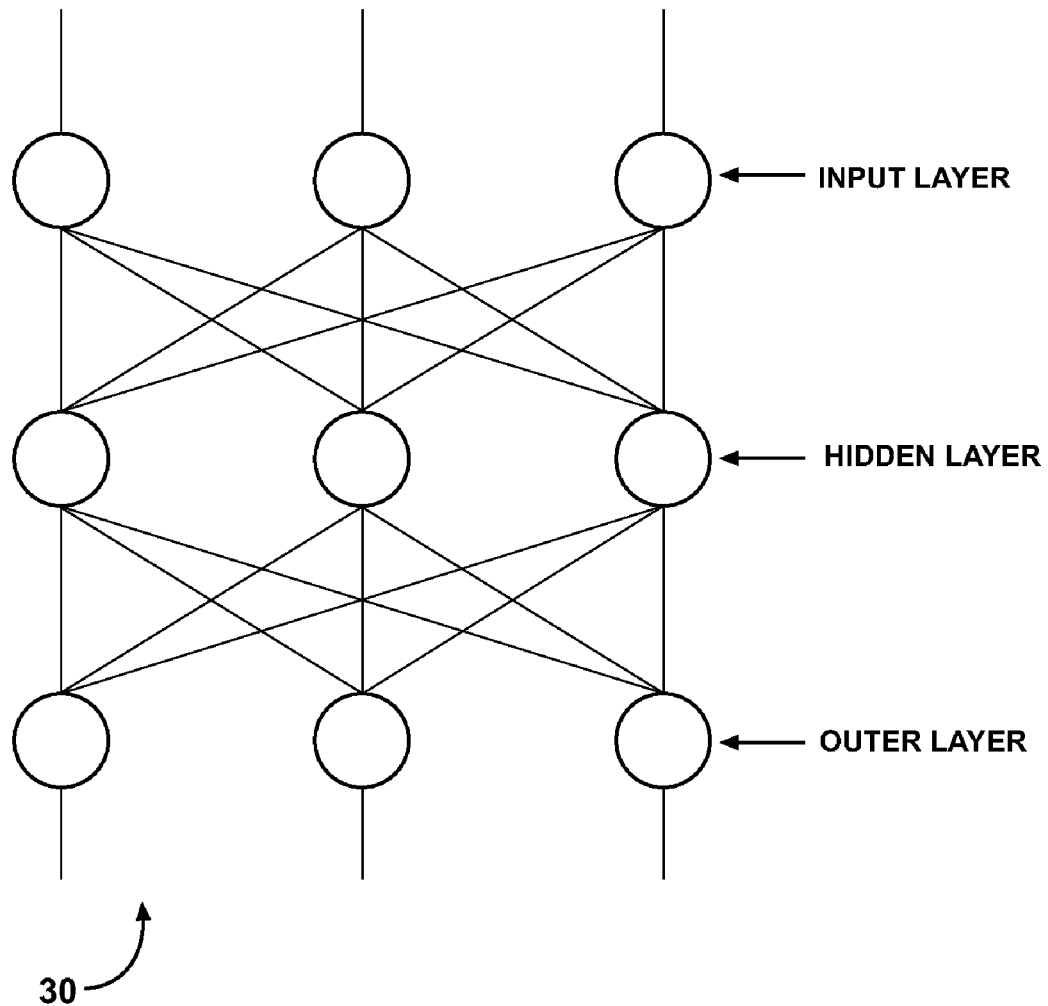
FIG. 7 is a schematic view of a neural network.
Figure 8A:
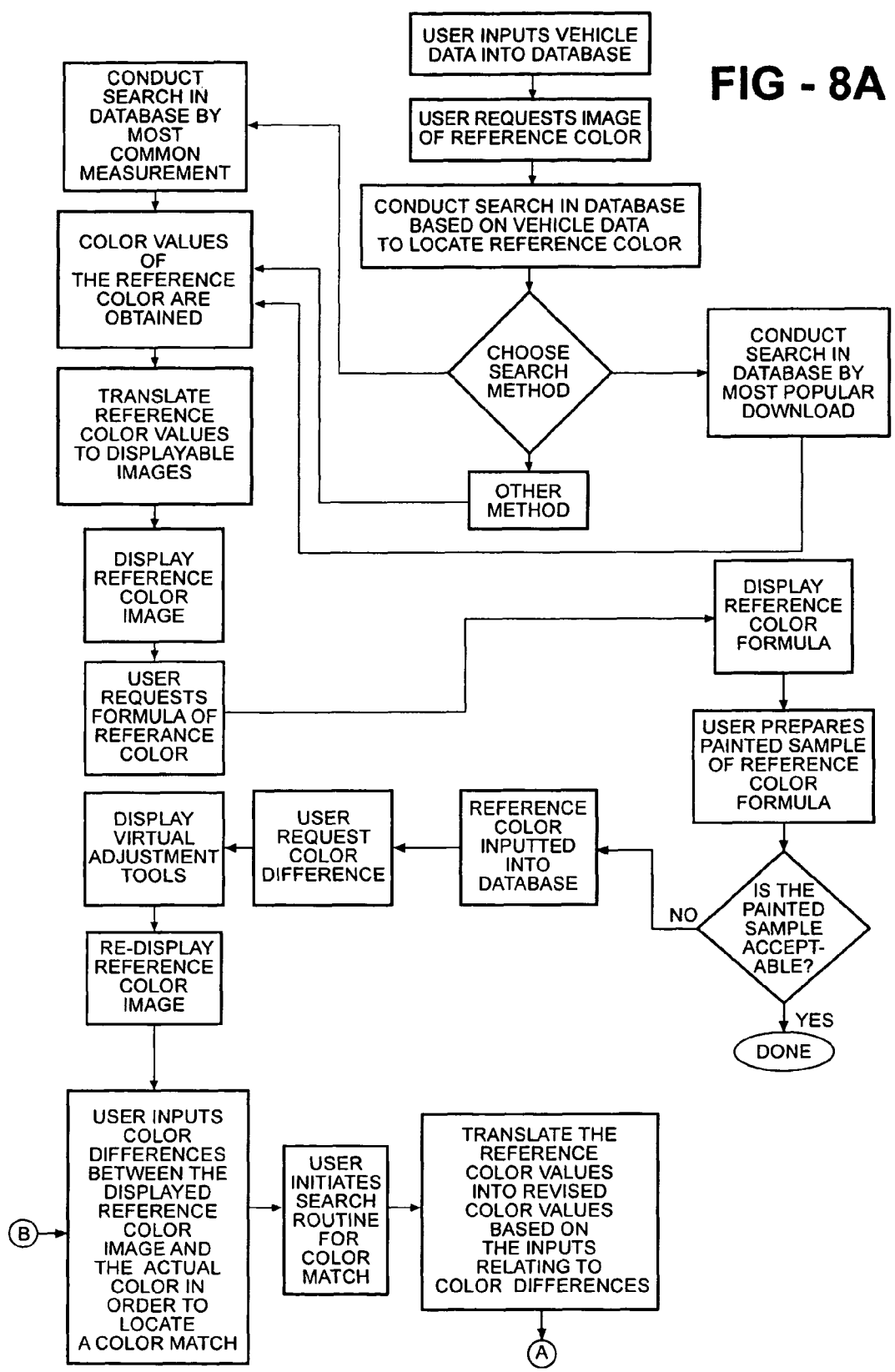
FIG. 8A is a partial flow chart of a second embodiment of the subject invention.
Figure 8B:
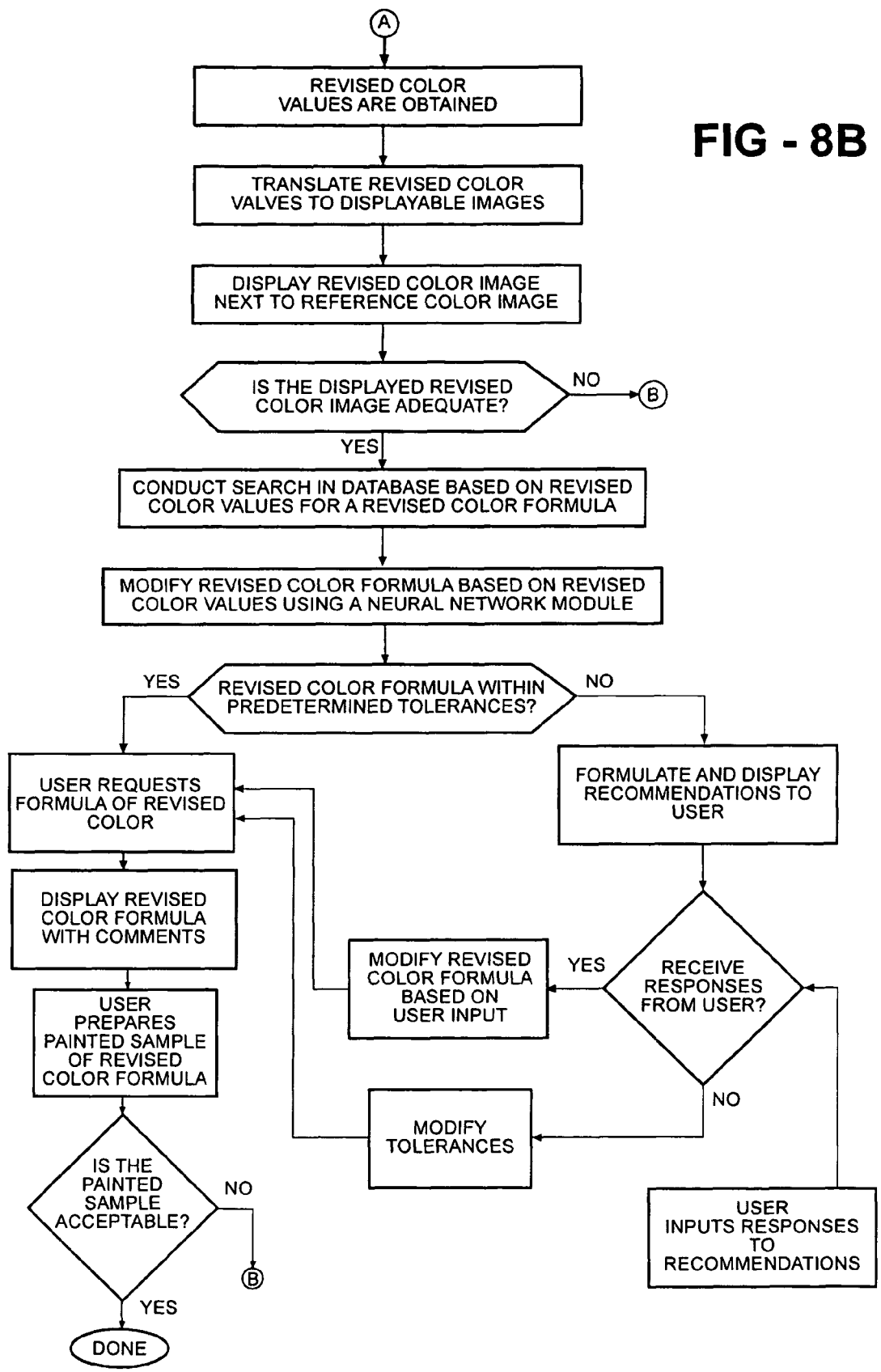
FIG. 8B is the remaining flow chart of the second embodiment.

A neural network module 30 is schematically shown in FIG. 7. More specifically, the neural network may be a back propagation neural network module 30 or any other suitable neural network module 30. Neural networks are computer systems that model vertebrae brain structure and processes. Neural network's techniques are a member of a group of methods which fall under the umbrella of artificial intelligence. Artificial intelligence is commonly associated with logic real-faced expert systems where real hierarchies used are reasoned from human knowledge. In contrast, neural networks are self-trained based on experience acquired through data compilation and computation. Thus artificial intelligence utilizing neural networks is particular useful in conjunction with complex systems or phenomena where the analysis is complicated, and deriving a model from human knowledge for use in a computer expert system is a daunting task.

Although neural networks differ in geometry, activation function, and training mechanics, they are typically organized into at least three layers. As shown in FIG. 7, the first layer is an input layer having one or more input nodes. The second layer is an output layer having one or more output nodes. Each output node corresponds with input nodes. Between the input and output layers, there are one or more hidden layers, each having one or more hidden nodes corresponding to an input node and output node pair. Each input variable is associated with an input node and each output variable is associated with an output node. Within a neural network, data flows in only one direction, such that each node only sends a signal to one or more nodes and receives no feedback.

The enabling power of a neural network is its connectivity, or the connections between the various nodes. This is a configuration technique modeled after the structure of the human brain. Moreover, because the network is structured, or connected, in such a way as to provide parallel processing, it is extremely efficient at acquiring and storing experimental knowledge and, then recalling and using that knowledge. More specifically, a node receives input values, processes them and provides an output. The processing step includes summing the inputs, adding a bias value and submitting this total input to an activation function which limits the magnitude of the output. The connections between the various nodes are weighted. An output sent from one node to another is multiplied by the weighting factor associated between those two particular nodes. The weighting factor represents the knowledge of the system. The system continues to accumulate knowledge and adjust the weighting factor in accordance with training in the further acquisition of knowledge by the network. Consequently the output of the neural network module agrees with the experience of the neural network module.

The output from the neural network module, such as the revised color formula, can take the form of a single continuous variable, a fuzzy variable set or any other suitable format. A fuzzy variable set is the bases for a mathematical system of fuzzy logic. "Fuzzy" refers to the uncertainty inherent in nearly all data. Fuzzy logic may used in artificial intelligent systems, specifically neural networks because there is a fuzziness in the output of the neural network. Fuzzy logic is based on fuzzy variables. Inputs to a known network may be provided for the fuzziness associated with each network parameter. An output parameter depicting the fuzziness of the result could also be incorporated into the neural network. The output parameter could range from value of 0 to 1, with a 1 indicated no uncertainty in the result. For example when gauging color match quality, there may be uncertainty in the measurement of the color values and in the descriptive value of the goodness of the match. A Fuzzy variable set as an output signal from the neural network indicates the level of uncertainty in the quality level of the result. Next, the quality and complements of the color match can be expressed as a 0.9 or 0.8, for example, where the quality is rated as very good at 0.9 and confidence or level of certainty is quite high at 0.8. As discussed below, this relative quality of the color match can be expressed to the user when the revised color formula is displayed.

Once the revised color formula is obtained, the computer then determines if the revised color formula is within predetermined tolerances. As shown in FIG. 1B, if the revised color formula is outside the predetermined tolerances one or more recommendations are formulated and displayed on the monitor to the user. An example recommendation could be "a darker and slightly bluer variant was found. Do you want to use this?". The user can then input responses to the recommendations. The revised color formula is then modified based on the inputted responses. Alternatively, the tolerances are modified, i.e., widened, for the revised color formula if responses to the recommendations are not inputted. A comment indicating that the tolerances were modified can be produced.

The user then requests the formula of the revised color by pressing the "Display Formula" button or by hovering the mouse of the revised color image. Comments indicating the level of acceptability of this revised color formula may also be displayed along with the revised color formula. As discussed above, the fuzzy logic variables determine the relative acceptability of this revised color formula.

The user will typically verify the acceptability of the revised color formula by preparing a painted sample and comparing this sample to the actual color. The user can then determine if a color deviation remains. One cycle of the method in accordance with the subject invention is now complete. However, it is possible that the revised color formula (painted sample) will not be an acceptable match to the actual color. If a color deviation remains, the user can then return to inputting additional color differences by further manipulating the virtual adjustment tools 26 as discussed above. In particular, the differences between the displayed revised color image 28 and the actual color would be inputted into the computer. The revised color values of the displayed revised color image 28 would then be translated into second revised color values using the computer. Similar steps as set forth above relating to conducting a search for the color formula, modifying the color formula, verifying that the second revised color formula is within predetermined tolerances, then translating the second revised values into displayable images will operate in a similar manner as discussed above. A second revised color image, which corresponds to the second revised color values, would be displayed on a monitor along with the revised color image. The user can then visually compare the inputted color differences between the displayed revised color image and the displayed second revised color image. Of course this process can continue until the displayed color image is adequately similar to the actual color of the part being repaired.

Figure 9:
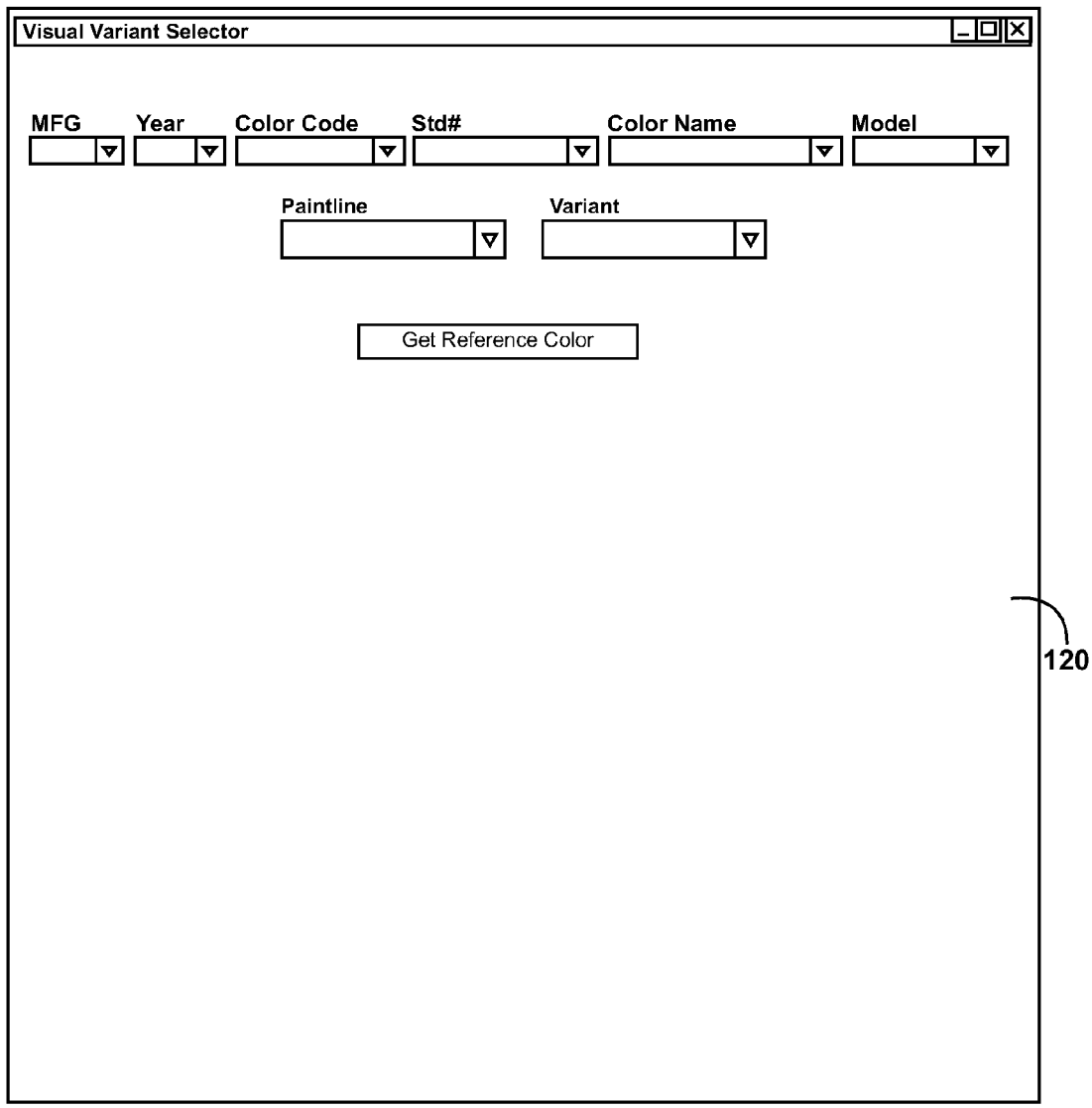
FIG. 9 is a planer view of an input screen.
Figure 10:
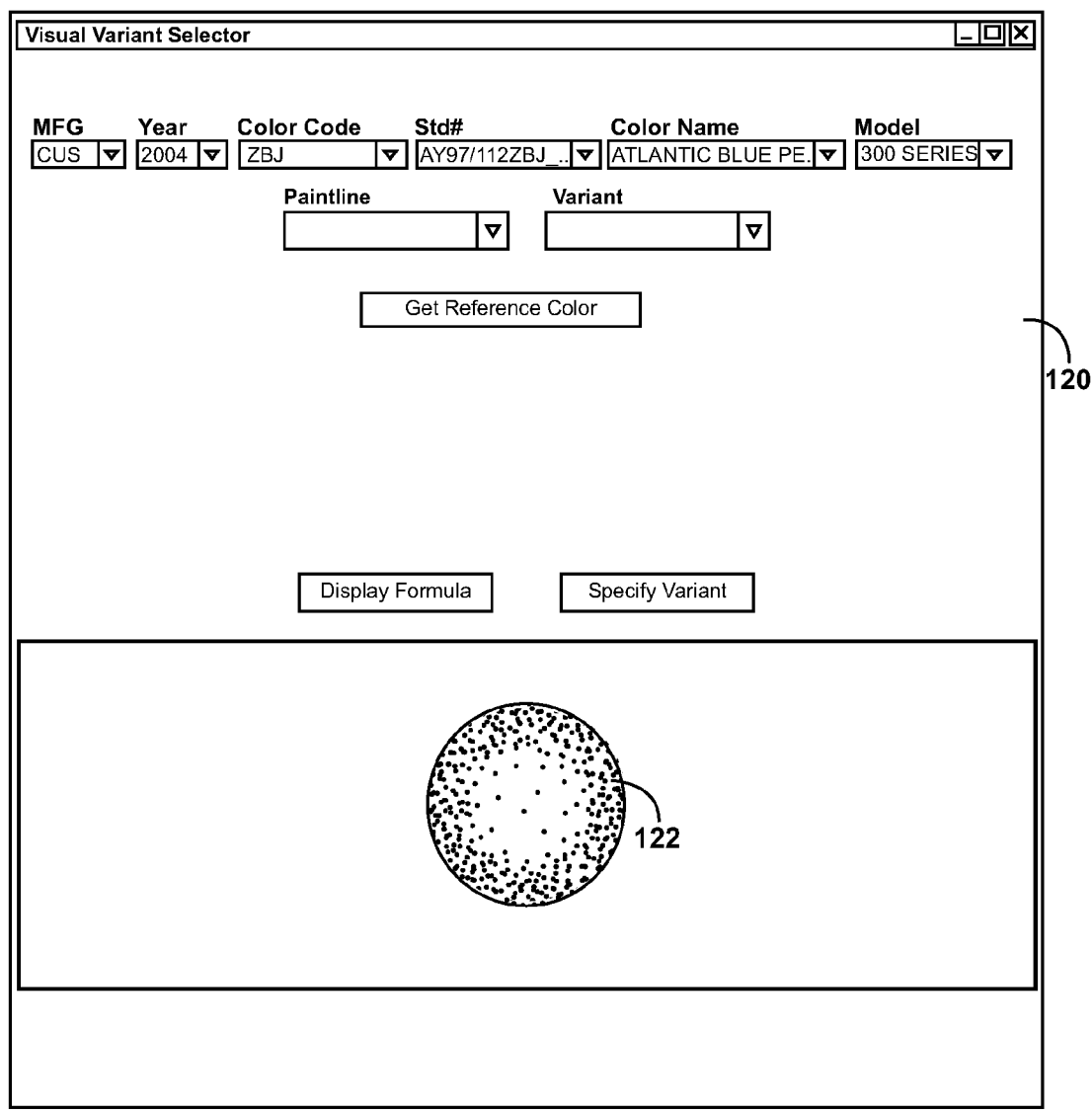
FIG. 10 is a planer view of the input screen that is partially populated with data and an image.

Turning to FIGS. 8A-14, an alternative method of obtaining a color match is disclosed. In this embodiment, the user only has the vehicle data and requires some additional assistance in locating a reference color. This method begins with the user inputting the vehicle data into the computer database. A blank input screen 120 is shown in FIG. 9 and the input screen 120 populated with the vehicle data is shown in FIG. 10. In particular, FIG. 10 includes vehicle data relating to the manufacturer, model year, color code, standard number, color name, and vehicle model.

The user will then request the image of the reference color by pressing the "Get Reference Color" button. The computer database then searches for the reference color. This reference color will represent a standard original equipment reference color associated with the vehicle data or a color of a particular vehicle. There are preferably different ways to search this reference color. One search method relates to searching by the most common measurement. Another alternative search method relates to searching by the most popular download. Yet another alternative search method involves utilizing the color measurement device (spectrophotometer) to determine and import the color of the particular vehicle. A secondary window may appear for the user to select the desired search method. As discussed above, there may be a number of color values and color formulations associated with a reference color for a particular vehicle. Regardless of the search method performed, the color values of the reference color are obtained based on the inputted vehicle data. In a similar manner as set forth above, the reference color values are translated into displayable images and then a reference color image 122 is displayed onto the monitor, preferably in the shape of a sphere. The image of the reference color is basically a visual confirmation that the correct data was inputted.

The user then requests the formula of the reference color by pressing the "Display Formula" button. The reference color formula is displayed such that the user can prepare a painted sample of the reference color formula. The user will then evaluate the painted sample against the actual color to determine if the painted sample is acceptable. If the sample is acceptable, then the process is completed. However, if the painted sample does not adequately match the color of the actual color, which is often the case, then the user must proceed through a similar color matching process as discussed above.

Figure 11:
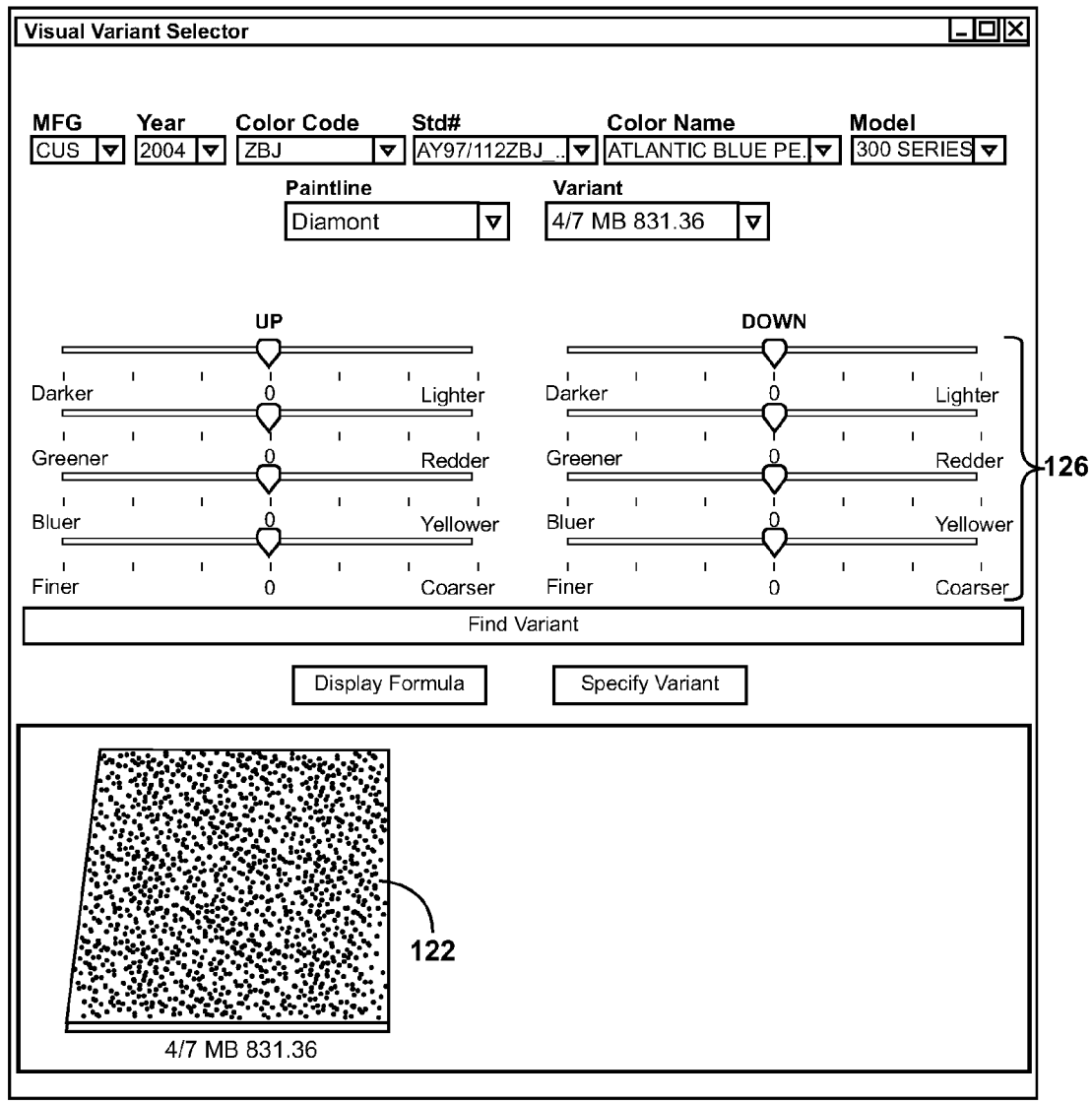
FIG. 11 is a planer view of an adjustment screen illustrating a virtual adjustment tool and is at least partially populated with data and an image.

First, the reference color is inputted into the database. In particular, the reference color values will be inputted into the database. As discussed above, this inputting could be done manually by the user or could be automatically accomplished by a computer. The user then requests the opportunity to input color differences by pressing the "Specify Color Differences" button. As with the first embodiment, a plurality of virtual adjustment tools 126 will be displayed along with a re-display of the reference color image 122. As shown in FIG. 11, the reference color is shown along with the vehicle data, the virtual adjustment tools 126 are visible, and the reference color image 122 is displayed as a flat plate.

Figure 12:
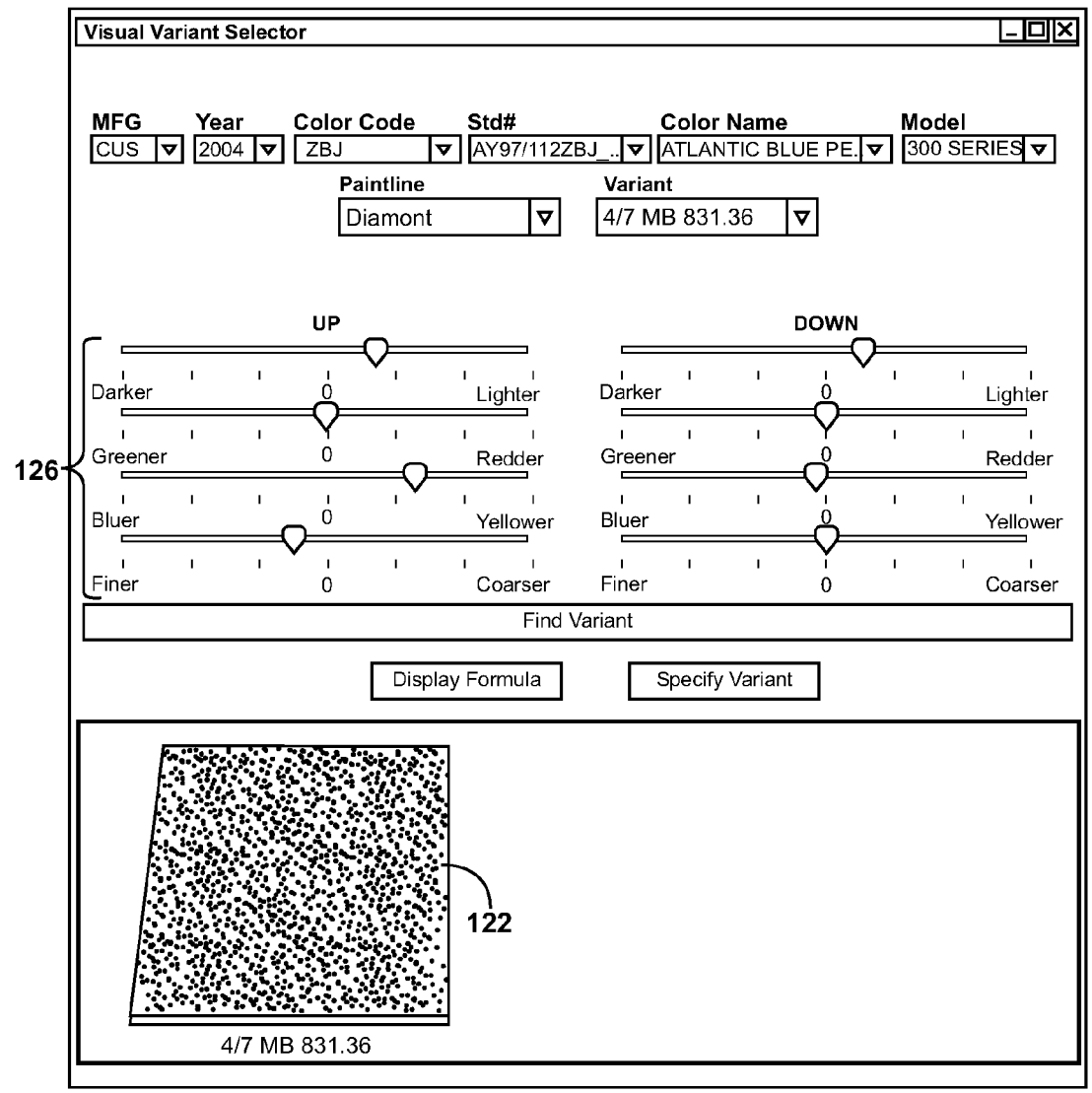
FIG. 12 is a planer view of the adjustment screen with a number of the virtual adjustment tools being manipulated.

As with the first embodiment, the subject invention as shown in FIGS. 11 and 12 creates a virtual paint room where the user can input a number of color differences between the displayed reference color image 122 and the actual color in order to locate a color match. Much of the same process discussed above is now conducted in order to locate the appropriate color match. In particular, the virtual adjustment tools 126 are manipulated and then the user initiates a search for a color match by pressing the "Find Color Match" button. In addition, the alternative means of inputting the differences between the reference color image 122 and the actual color discussed above could be utilized. The reference color values are translated into revised color values based on the inputted color differences using the computer and the revised color values are then translated into displayable images.

Figure 13:
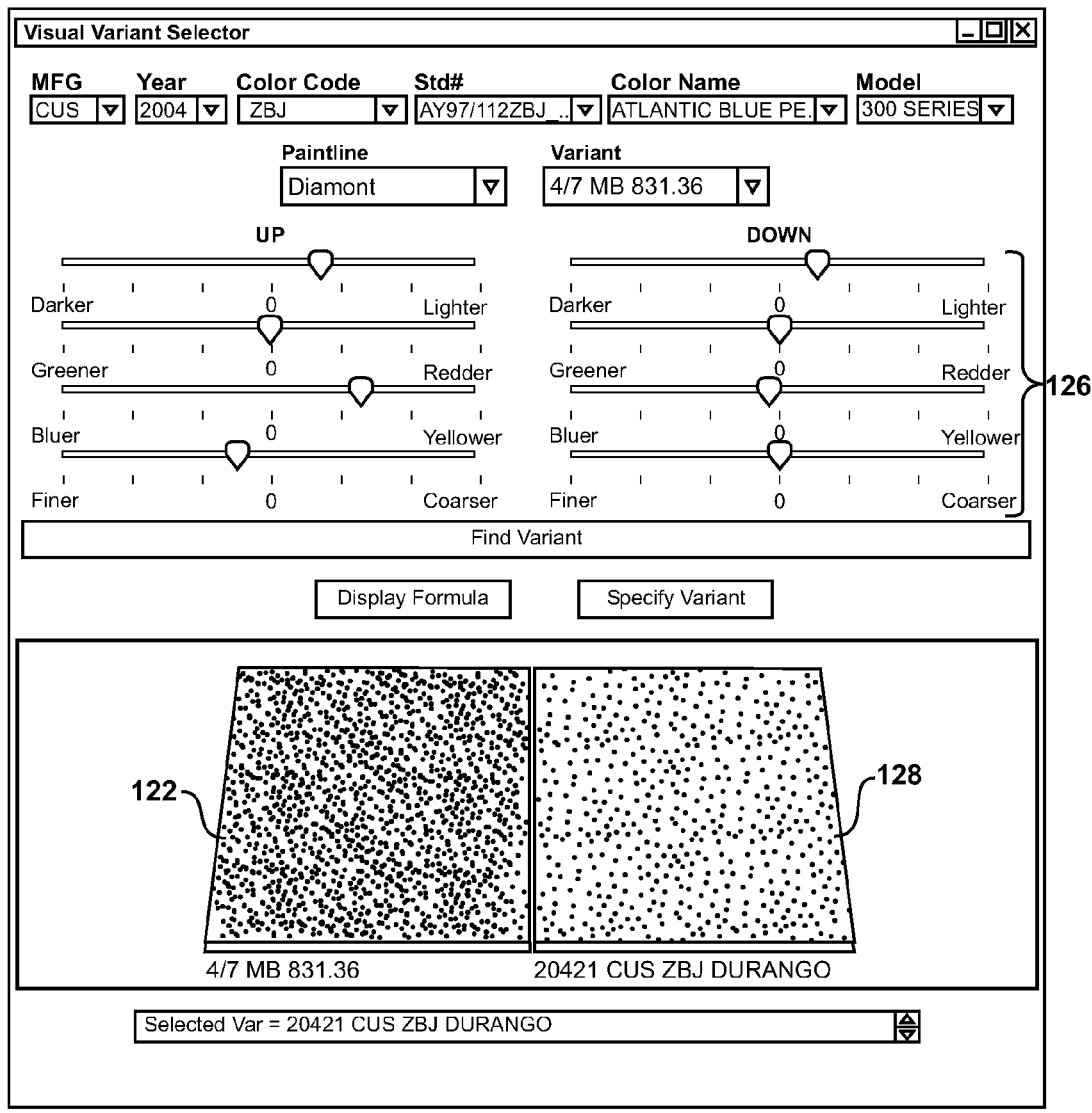
FIG. 13 is a planer view of the adjustment screen with reference and revised color images being displayed.
Figure 14:
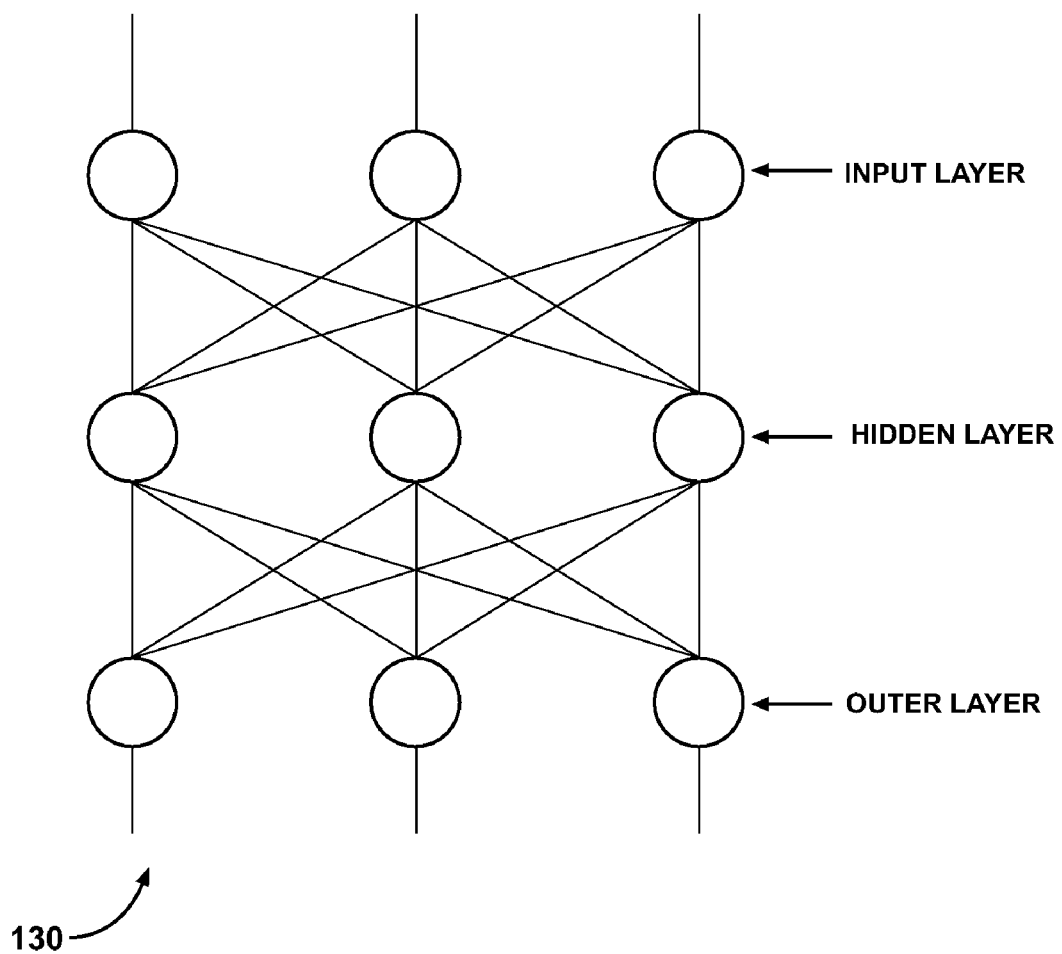
FIG. 14 is a schematic view of a neural network.

As shown in FIG. 13, a revised color image 128 is displayed on the monitor next to the reference color image 122 at the same time. The user then visually compares the color differences and is prompted to determine if the displayed revised color image 128 is adequate. The revised color image 128 can be further adjusted until the revised color image 128 is acceptable. Once satisfied, the user will initiate a search in the database based on the revised color values for the revised color formula. The revised color formula is then modified based on the revised color values using a neural network module 130 (see FIG. 14). The revised color formula is then obtained and the computer determines if the revised color formula is within predetermined tolerances (see FIG. 8B). The user requests the formula of the revised color by pressing the "Display Formula" button or by hovering the mouse of the revised color image 128. Comments indicating the level of acceptability of this revised color formula may also be displayed along with the revised color formula.

As with the first embodiment, the user will typically verify the acceptability of the revised color formula by preparing a painted sample and comparing this sample to the actual color. One cycle of this alternative method is now complete. As with the first embodiment, further modifications to the revised color image can be made.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

What is claimed is:

1. A method of visualizing a color deviation of an actual color of a vehicle using a computer having a monitor, said method comprising the steps of:
   inputting data into the computer associated with a reference color;
   obtaining reference color values of the reference color based on the inputted data;
   displaying a reference color image on the monitor with the reference color image corresponding to the reference color values;
   inputting color differences between the displayed reference color image and the actual color of the vehicle into the computer;
   translating the reference color values into revised color values based on the inputted color differences using the computer;
   translating the reference color values into a translated reference color image and translating the revised color values into a translated revised color image; and
   displaying the translated revised color image, corresponding to the revised color values, on the monitor along with the translated reference color image for a user to visually compare the inputted color differences between the displayed translated revised color image and at least one of the displayed reference color image or the actual color of the vehicle or the displayed reference color image and the actual color of the vehicle.

2. A method as set forth in claim 1 wherein the step of inputting color differences is further defined as manipulating a virtual adjustment tool.

3. A method as set forth in claim 2 further including the step of displaying the virtual adjustment tool on the monitor prior to manipulating the virtual adjustment tool.

4. A method as set forth in claim 3 wherein the virtual adjustment tool corresponds to a particular parameter of the displayed reference color image and wherein the step of manipulating the virtual adjustment tool is further defined as manipulating the particular parameter to define a difference for the parameter between the displayed reference color image and the actual color.

5. A method as set forth in claim 1 further including the step of displaying a plurality of virtual adjustment tools on the monitor with each of the virtual adjustment tools corresponding to a particular parameter of the displayed reference color image after the reference color image is displayed.

6. A method as set forth in claim 5 wherein the step of inputting color differences is further defined as manipulating at least one of the virtual adjustment tools to define a difference for the parameter between the displayed reference color image and the actual color.

7. A method as set forth in claim 5 further including the step of obtaining a reference formula corresponding to the reference color values after obtaining the reference color values.

8. A method as set forth in claim 7 wherein the step of inputting color differences is further defined as modifying the reference formula, automatically moving the virtual adjustment tools in response to the modifications, and automatically updating the revised color image in response to the modifications.

9. A method as set forth in claim 5 wherein the step of inputting color differences is further defined as utilizing a color measurement device to import color values of the actual color into the computer.

10. A method as set forth in claim 9 further including the steps of determining the differences between the imported color values and the reference color values, automatically moving the virtual adjustment tools in response to the imported color values, and automatically updating the revised color image in response to the imported color values after utilizing the color measurement device.

11. A method as set forth in claim 1 wherein the step of displaying the reference color image on the monitor is further defined as displaying the reference color image in the shape of a sphere.

12. A method as set forth in claim 1 wherein the step of displaying the revised color image on the monitor along with the reference color image is further defined as displaying the revised and reference color images on the same monitor at the same time.

13. A method as set forth in claim 12 wherein the step of displaying the revised and reference color images on the monitor is further defined as displaying the revised and reference color images adjacent to each other on the monitor at the same time.

14. A method as set forth in claim 13 wherein the step of displaying the revised and reference color images on the monitor is further defined as displaying the revised and reference color images in the shape of flat plates.

15. A method as set forth in claim 14 further including the step of manipulating the flat plates to provide a plurality of different viewing angles for the revised and reference color images after the flat plates are displayed.

16. A method as set forth in claim 1 wherein the step of inputting data is further defined as inputting the reference color into a computer database and wherein the step of obtaining the reference color values is further defined as conducting a search in the database to obtain the corresponding reference color values.

17. A method as set forth in claim 16 further including the step of inputting vehicle data into the computer database in conjunction with the inputting of the reference color prior to obtaining the reference color values.

18. A method as set forth in claim 1 further including the steps of inputting the revised color values into a computer database and conducting a search in the database for a revised color formula after the revised color values are obtained.

19. A method as set forth in claim 18 wherein the computer includes a neural network module and further including the step of modifying the revised color formula based on the revised color values using the neural network.

20. A method as set forth in claim 18 further including the step of displaying the revised color formula on the monitor after the revised color formula is obtained.

21. A method as set forth in claim 18 further including the step of determining if the revised color formula is within predetermined tolerances after the revised color formula is obtained.

22. A method as set forth in claim 21 further including the step of displaying recommendations on the monitor if the revised color formula is outside of the predetermined tolerances after the revised color formula is obtained.

23. A method as set forth in claim 22 further including the step of inputting responses to the recommendations and modifying the revised color formula based on the inputted responses after displaying the recommendations.

24. A method as set forth in claim 22 further including the step of modifying tolerances for the revised color formula if responses to the recommendations are not inputted after displaying the recommendations.

25. A method as set forth in claim 18 further including the steps of preparing a painted sample of the revised color formula and comparing the painted sample to the actual color to determine if a color deviation between the revised color formula and the actual color remains after the revised color formula is obtained.

26. A method as set forth in claim 25 further including the step of inputting color differences between the displayed revised color image and the actual color into the computer after comparing the painted sample to the actual color.

27. A method as set forth in claim 26 further including the step of translating the revised color values of the translated revised color image into second revised color values using the computer after further inputting color differences.

28. A method as set forth in claim 27 further including the step of displaying a second revised color image, corresponding to the second revised color values, on the monitor along with the revised color image for visually comparing the inputted color differences between the displayed revised color image and the displayed second revised color image after the second revised color values are obtained.

29. A method of visualizing a color deviation of an actual color of a vehicle using a computer having a monitor, said method comprising the steps of:
   inputting vehicle data into the computer;
   obtaining a reference color and corresponding reference color values based on the inputted vehicle data;
   displaying a reference color image on the monitor with the reference color image corresponding to the reference color values;
   inputting color differences between the displayed reference color image and the actual color of the vehicle into the computer;
   translating the reference color values into revised color values based on the inputted color differences using the computer;
   displaying a revised color image, corresponding to the revised color values, and the reference color image adjacent to each other on the monitor at the same time for a user to visually compare the inputted color differences between the displayed reference color image and the displayed revised color image with the revised and reference color images being displayed in the shape of flat plates; and
   manipulating the flat plates to provide a plurality of different viewing angles for the revised and reference color images after the flat plates have been displayed.

30. A method as set forth in claim 29 wherein the step of inputting color differences is further defined as manipulating a virtual adjustment tool.

31. A method as set forth in claim 30 further including the step of displaying the virtual adjustment tool on the monitor prior to manipulating the virtual adjustment tool.

32. A method as set forth in claim 31 wherein the virtual adjustment tool corresponds to a particular parameter of the displayed reference color image and wherein the step of manipulating the virtual adjustment tool is further defined as manipulating the particular parameter to define a difference for the parameter between the displayed reference color image and the actual color.

33. A method as set forth in claim 29 further including the step of displaying a plurality of virtual adjustment tools on the monitor with each of the virtual adjustment tools corresponding to a particular parameter of the displayed reference color image after the reference color image is displayed.

34. A method as set forth in claim 33 further including the step of manipulating at least one of the virtual adjustment tools to define a difference for the parameter between the displayed reference color image and the actual color after displaying the virtual adjustment tools.

35. A method as set forth in claim 29 further including the steps of obtaining a reference color formula corresponding to the reference color values and displaying the reference color formula on the monitor after obtaining the reference color values.

36. A method as set forth in claim 35 further including the steps of preparing a painted sample of the reference color formula and comparing the painted sample to the actual color to determine if a color deviation between the reference color formula and the actual color exists after the reference color formula is obtained.

37. A method as set forth in claim 36 further including the step of inputting the reference color into the computer if a color deviation between the reference color formula and the actual color exists such that color differences can be inputted after the painted sample is prepared.

38. A method as set forth in claim 29 wherein the step of inputting vehicle data into the computer is further defined as inputting the vehicle data into a computer database and wherein the step of obtaining the reference color and reference color values is further defined as conducting a search in the database based on the vehicle data.

39. A method as set forth in claim 29 further including the steps of inputting the revised color values into a computer database and conducting a search in the database for a revised color formula after the revised color values are obtained.

40. A method as set forth in claim 39 wherein the computer includes a neural network module and further including the step of modifying the revised color formula based on the revised color values using the neural network.

41. A method as set forth in claim 39 further including the steps of displaying the revised color formula on the monitor, preparing a painted sample of the revised color formula, and comparing the painted sample to the actual color to determine if a color deviation between the revised color formula and the actual color remains after the revised color formula is obtained.

42. A method of visualizing a color deviation of an actual color of a vehicle using a computer having a monitor and a neural network module, said method comprising the steps of:
inputting data into the computer associated with a reference color;
obtaining reference color values of the reference color based on the inputted data;
displaying a reference color image on the monitor with the reference color image corresponding to the reference color values;
inputting color differences between the displayed reference color image and the actual color of the vehicle into the computer;
translating the reference color values into revised color values based on the inputted color differences using the computer;
inputting the revised color values into a computer database and conducting a search in the database for a revised color formula;
modifying the revised color formula based on the revised color values using the neural network;
displaying a revised color image, corresponding to the modified revised color formula, on the monitor for a user to visually compare the inputted color differences between the reference color image and the displayed revised color image.

43. A method as set forth in claim 42 further including the step of displaying a plurality of virtual adjustment tools on the monitor with each of the virtual adjustment tools corresponding to a particular parameter of the displayed reference color image after displaying the reference color image.

44. A method as set forth in claim 43 wherein the step of inputting color differences is further defined as manipulating at least one of the virtual adjustment tools to define a difference for the parameter between the displayed reference color image and the actual color.

45. A method as set forth in claim 43 further including the step of obtaining a reference formula corresponding to the reference color values after the reference color values are obtained.

46. A method as set forth in claim 45 wherein the step of inputting color differences is further defined as modifying the reference formula, automatically moving the virtual adjustment tools in response to the modifications, and automatically updating the revised color image in response to the modifications.

47. A method as set forth in claim 42 wherein the step of displaying the reference color image on the monitor is further defined as displaying the reference color image in the shape of a sphere.

48. A method as set forth in claim 42 further including the step of displaying the revised color formula on the monitor after the revised color formula is obtained.

49. A method as set forth in claim 42 further including the step of determining if the revised color formula is within predetermined tolerances after the revised color formula is obtained.

50. A method as set forth in claim 49 further including the step of displaying recommendations on the monitor if the revised color formula is outside of the predetermined tolerances after the revised color formula is obtained.

51. A method as set forth in claim 50 further including the step of inputting responses to the recommendations and modifying the revised color formula based on the inputted responses after displaying the recommendations.

52. A method as set forth in claim 50 further including the step of modifying tolerances for the revised color formula if responses to the recommendations are not inputted after displaying the recommendations.

* * * * *